United States Patent
Rothberg

(10) Patent No.: US 7,451,344 B1
(45) Date of Patent: Nov. 11, 2008

(54) OPTIMIZING ORDER OF ERROR RECOVERY STEPS IN A DISK DRIVE

(75) Inventor: Michael S. Rothberg, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 613 days.

(21) Appl. No.: 11/102,330

(22) Filed: Apr. 8, 2005

(51) Int. Cl.
 *G06F 11/00* (2006.01)
(52) U.S. Cl. ........................................... 714/5
(58) Field of Classification Search ................ 714/769, 714/5
 See application file for complete search history.

(56) References Cited

U.S. PATENT DOCUMENTS 6,052,804 A 4/2000 Thowe et al.
6,381,725 B1 * 4/2002 Isokawa .................. 714/769
6,920,005 B2 * 7/2005 Yun ........................... 360/53

* cited by examiner

*Primary Examiner*—Michael C Maskulinski
(74) *Attorney, Agent, or Firm*—Howard H. Sheerin, Esq.

(57) ABSTRACT

A method is disclosed for ordering error recovery steps of an error recovery procedure executed by a disk drive, wherein each error recovery step having an execution time. The disk drive comprises a disk having a plurality of tracks, wherein each track comprises a plurality of data sectors. A plurality of step success counters are initialized, wherein each counter corresponds to one of the error recovery steps. A plurality of the error recovery steps are executed, wherein if an error recovery step successfully recovers one of the data sectors the corresponding step success counter is incremented. A step priority value is computed for each error recovery step in response to the step success counter and execution time for each step. The error recovery steps are then ordered in response to the step priority values.

14 Claims, 6 Drawing Sheets

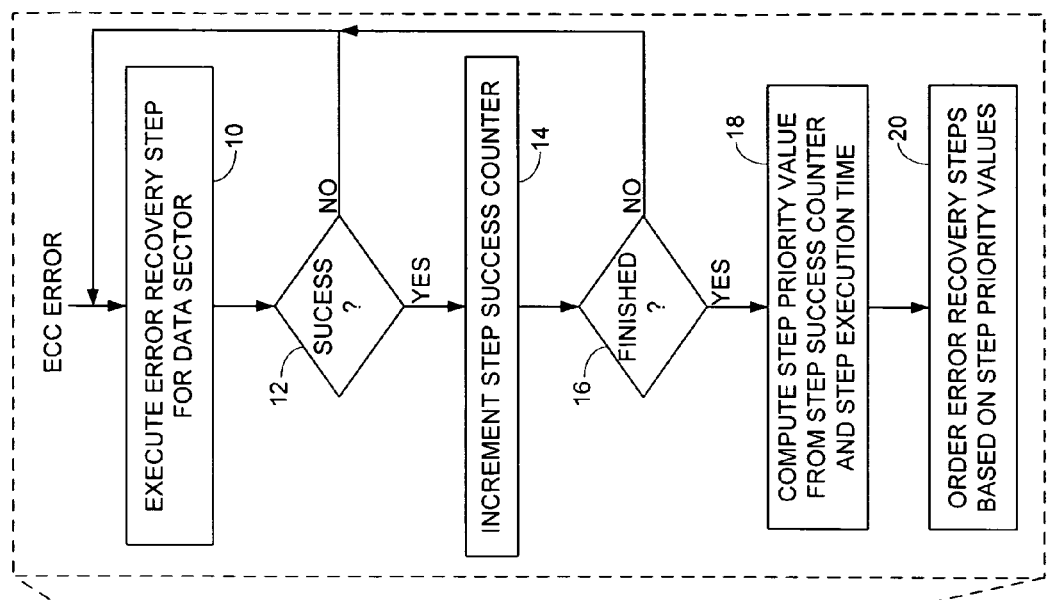
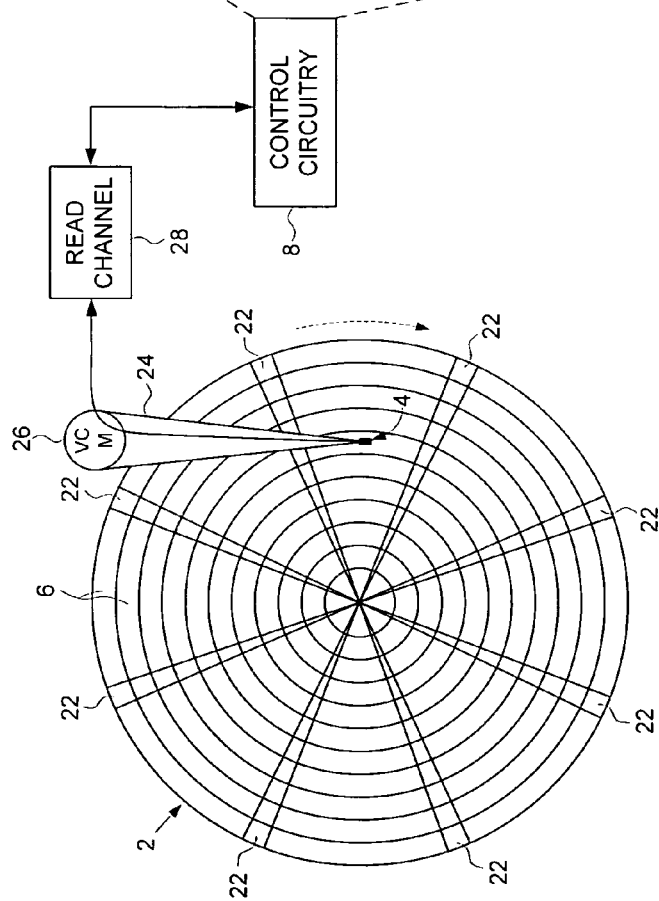
FIG. 1
FIG. 2

OPTIMIZING ORDER OF ERROR RECOVERY STEPS IN A DISK DRIVE

BACKGROUND OF THE INVENTION

1. Field of the Invention

The present invention relates to disk drives. More particularly, the present invention relates to optimizing the order of error recovery steps in a disk drive.

2. Description of the Prior Art

Disk drives employ an "on-the-fly" error detection and correction system that employs an error correction code (ECC), such as a Reed-Solomon code, to detect and correct errors in data sectors recorded on the disk. If the number of errors exceed the error correction capability of the ECC, the disk drive executes a "heroic" error recovery procedure wherein a number of retry operations are performed in an attempt to recover the errant data sector by rereading the data sector numerous times. The error recovery procedure adjusts a number of parameters during the retry reads in an attempt to reduce the signal-to-noise ratio (SNR) until the number of errors falls within the error correction capability of the ECC. For example, the error recovery procedure may adjust a gain of an amplifier, a cutoff frequency of a low pass filter, coefficients of an equalizing filter, a bias setting for a magnetoresistive head, a tracking offset, a timing recovery parameter, etc.

Each parameter is typically adjusted independent of the other parameters. That is, the error recovery procedure comprises a number of error recovery steps, wherein each error recovery step adjusts one parameter, such as the gain of an amplifier, while leaving the other parameters unchanged. Within each error recovery step, the parameter may be set to a number of different values during each retry read operation. For example, the gain of an amplifier may be set to a minimum value and slowly incremented for each retry operation until the data sector is recovered. If all of the gain settings are attempted without success, the gain of the amplifier is reset to a nominal value and the next error recovery step of the error recovery procedure is executed.

The execution time for each error recovery step varies based on the number of values that each parameter takes on, and the number of retry reads attempted for each parameter value. In an attempt to minimize the average time to recover errant data sectors, the error recovery steps are typically ordered based on the effectiveness in successfully recovering data sectors. However, ordering the error recovery steps based on effectiveness does not take into account the execution time for each error recovery step. For example, a highly effective error recovery step may have a significantly long execution time whereas a less effective error recovery step having a much shorter execution time may successfully recover an errant data sector under certain conditions, thereby reducing the overall recovery time on average if the less effective error recovery step is executed earlier in the error recovery procedure.

Another drawback with the prior art is that the order of the error recovery steps is fixed for a family of disk drives based on a nominal set of operating conditions and expected deviation due to manufacturing tolerances. However, for disk drives that deviate significantly from the normal manufacturing characteristics or that operate in unusual environments (e.g., mobile applications) the nominal order of error recovery steps may be far from optimal resulting in a significantly longer error recovery time on average.

There is, therefore, a need to optimize the order of the error recovery steps of an error recovery procedure executed by a disk drive to reduce the average time to recover errant data sectors.

SUMMARY OF THE INVENTION

The present invention may be regarded as a disk drive comprising a disk and a head actuated over the disk, wherein the disk comprises a plurality of tracks and each track comprises a plurality of data sectors. The disk drive further comprises disk control circuitry for executing an error recovery procedure comprising a plurality of error recovery steps, wherein each error recovery step having an execution time. The disk control circuitry for ordering the error recovery steps by initializing a plurality of step success counters each corresponding to one of the error recovery steps. A plurality of the error recovery steps are executed for a plurality of the data sectors, wherein if an error recovery step successfully recovers one of the data sectors the corresponding step success counter is incremented. A step priority value is computed for each error recovery step in response to the step success counter and the execution time for each error recovery step. The error recovery steps are then ordered in response to the step priority values.

In one embodiment, more than one of the error recovery steps may successfully recover a data sector. In another embodiment, the disk control circuitry terminates the error recovery procedure for a data sector when one of the error recovery steps successfully recovers the data sector.

In yet another embodiment, the disk control circuitry orders the error recovery steps in response to the step priority values by pruning at least one of the error recovery steps from the error recovery procedure.

In another embodiment, the step success counters are reset and a plurality of the error recovery steps are re-executed for a plurality of the data sectors, wherein the disk control circuitry terminates the error recovery procedure for a current data sector when one of the error recovery steps successfully recovers the data sector and increments the corresponding step success counter. The error recovery steps are then reordered (and in one embodiment pruned) in response to the step success counters. In one embodiment, the plurality of error recovery steps that are re-executed are consecutive after ordering the error recovery steps in response to the step priority values, and the plurality of error recovery steps re-executed have the same execution time.

The present invention may also be regarded as a method of ordering a plurality of error recovery steps of an error recovery procedure executed by a disk drive, wherein each error recovery step having an execution time. The disk drive comprises a disk and a head actuated over the disk, wherein the disk comprises a plurality of tracks and each track comprises a plurality of data sectors. A plurality of step success counters are initialized, wherein each step success counter corresponds to one of the error recovery steps. A plurality of the error recovery steps are executed for a plurality of the data sectors, wherein if one of the error recovery steps successfully recovers one of the data sectors the corresponding step success counter is incremented. A step priority value is computed for each error recovery step in response to the step success counter and the execution time for each error recovery step. The error recovery steps are then ordered in response to the step priority values.

BRIEF DESCRIPTION OF THE DRAWINGS

FIG. 1 shows a disk drive according to an embodiment of the present invention comprising a disk and a head actuated over the disk, wherein the disk comprises a plurality of tracks and each track has a plurality of data sectors.

FIG. 2 shows a flow diagram executed by disk control circuitry of the disk drive for ordering error recovery steps of an error recovery procedure according to an embodiment of the present invention.

DESCRIPTION OF THE PREFERRED EMBODIMENTS

Figure 3:
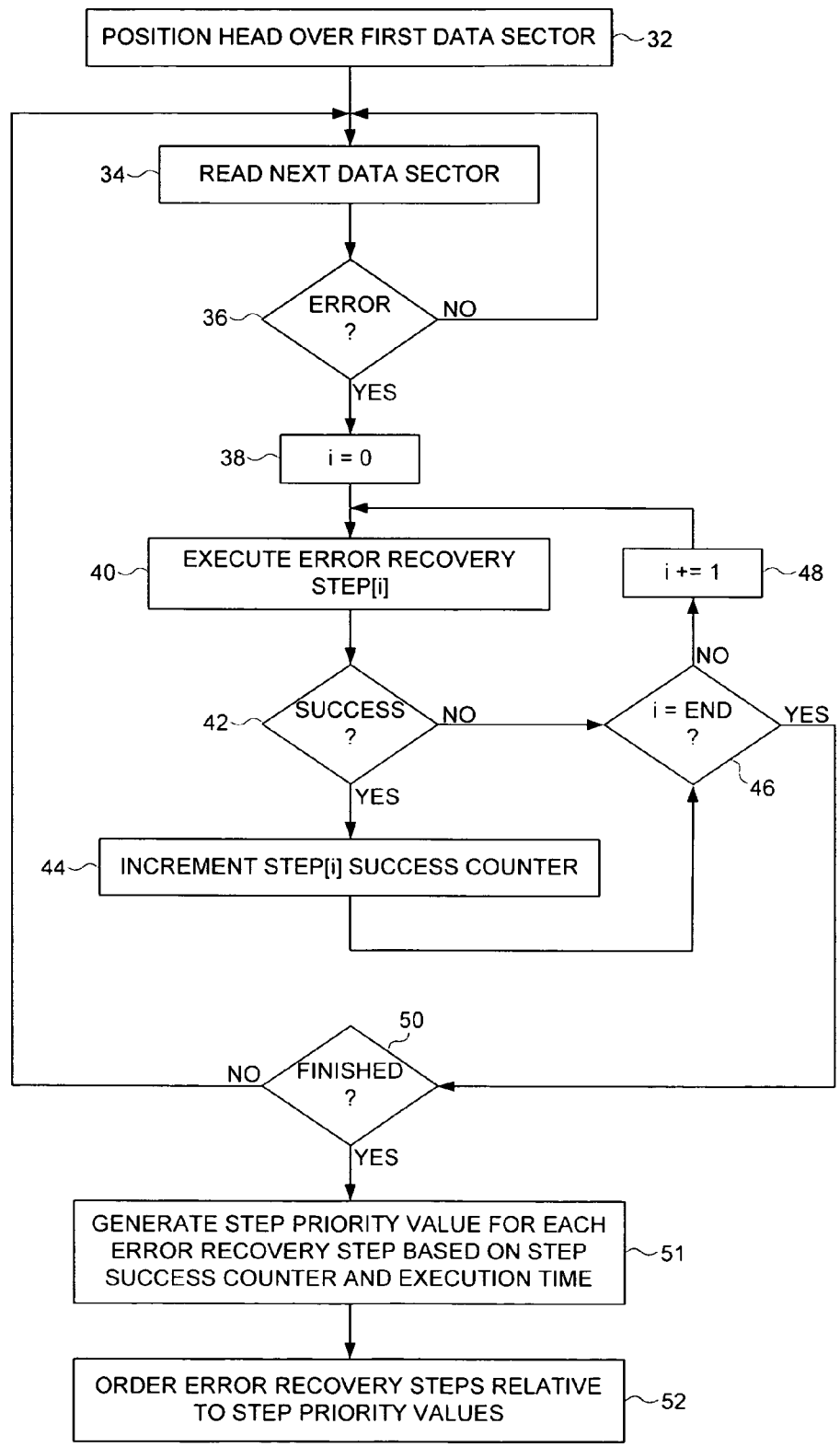
FIG. 3 shows a flow diagram according to an embodiment of the present invention wherein each error recovery step is executed for a plurality of data sectors, wherein when one of the error recovery steps successfully recovers one of the data sectors the corresponding step success counter is incremented.

FIG. 1 shows a disk drive according to an embodiment of the present invention comprising a disk 2 and a head 4 actuated over the disk 2, wherein the disk 2 comprises a plurality of tracks 6 and each track 6 comprises a plurality of data sectors. The disk drive further comprises disk control circuitry 8 for executing an error recovery procedure comprising a plurality of error recovery steps, wherein each error recovery step having an execution time. The disk control circuitry 8 maintains a plurality of step success counters each corresponding to one of the error recovery steps. The disk control circuitry 8 executes the flow diagram of FIG. 2 wherein if a data sector cannot be recovered using the ECC circuitry at step 10 a plurality of the error recovery steps are executed for a plurality of the data sectors, wherein if an error recovery step successfully recovers one of the data sectors at step 12, at step 14 the corresponding step success counter is incremented. When finished executing the error recovery steps at step 16, at step 18 a step priority value is computed for each error recovery step in response to the step success counter and execution time for each error recovery step. At step 20 the error recovery steps are ordered in response to the step priority values.

In the disk drive shown in the embodiment of FIG. 1, the disk 2 comprises a plurality of embedded servo sectors 22 forming servo wedges. The embedded servo sectors 22 comprise positioning information, such as a track address and servo bursts, for positioning the head 4 over a target data sector during write and read operations. The head 4 is connected to a distal end of an actuator arm 24 which is rotated about a pivot by a voice coil motor (VCM) 26 to actuate the head 4 radially over the disk 2. The read signal emanating from the head 4 is demodulated by a read channel 28 into an estimated data sequence representing the data recorded on the disk 2 (the user data and servo data). The disk control circuitry 8 comprises error correction code (ECC) circuitry for detecting and correcting errors in the estimated data sequence. The disk control circuitry 8 processes the servo data to generate a position error signal (PES) used to control the VCM 26.

In one embodiment, the disk control circuitry 8 executes the error recovery procedure to order the error recovery steps as part of a manufacturing process. Once the disk drive is assembled, the disk control circuitry 8 verifies the integrity of the disk 4 by writing test data to each data sector and then reading each data sector. If a data sector cannot be recovered using the ECC circuitry, the disk control circuitry 8 executes the error recovery procedure to recover the errant data sector. If the error recovery procedure cannot recover the errant data sector, it is relocated to a spare data sector. While executing the error recovery steps, the disk control circuitry 8 maintains the step success counters which are then used to order the error recovery steps.

In one embodiment, the disk control circuitry 8 executes the plurality of error recovery steps for a plurality of the data sectors such that more than one error recovery step may successfully recover a data sector. This embodiment is illustrated in FIG. 3 wherein at step 32 the head 4 is positioned over the first data sector and at step 34 the data sector is read. If at step 36 the data sector cannot be recovered on-the-fly using the ECC circuitry, then at step 38 an index 1 is initialized to zero and at step 40 error recovery step[i] is executed in an attempt to recover the errant data sector. If at step 42 the error recovery step[i] is successful in recovering the errant data sector, at step 44 the corresponding step success counter is incremented. This process is repeated for the next error recovery step (after incrementing index 1 at step 48) until at step 46 all of the error recovery steps have been executed for the errant data sector. If there are more data sectors to read at step 50, then the process continues at step 34 by reading the next data sector. Once all of the data sectors have been read at step 50, at step 51a step priority value is computed for each error recovery step in response to the step success counter and execution time for each step. At step 52 the error recovery steps are ordered in response to the step priority values.

The step priority values may be computed using any suitable function. In general, the step success counter, which is an indication of effectiveness, is given a positive weighting, whereas execution time is given a proportional negative weighting. In this manner, the more effective error recovery steps having shorter execution time are executed toward the beginning of the error recovery procedure. In one embodiment, the step priority value is computed by simply subtracting the execution time from the step success counter. In an alternative embodiment, a more sophisticated function is employed, such as any suitable polynomial. In addition, the execution times for each error recovery step may be measured in any suitable units, such as microseconds or number of program steps. The execution time may be predetermined according to the number of programming steps, or it may be determined by the disk control circuitry 8 executing the error recovery step.

Figure 4A:
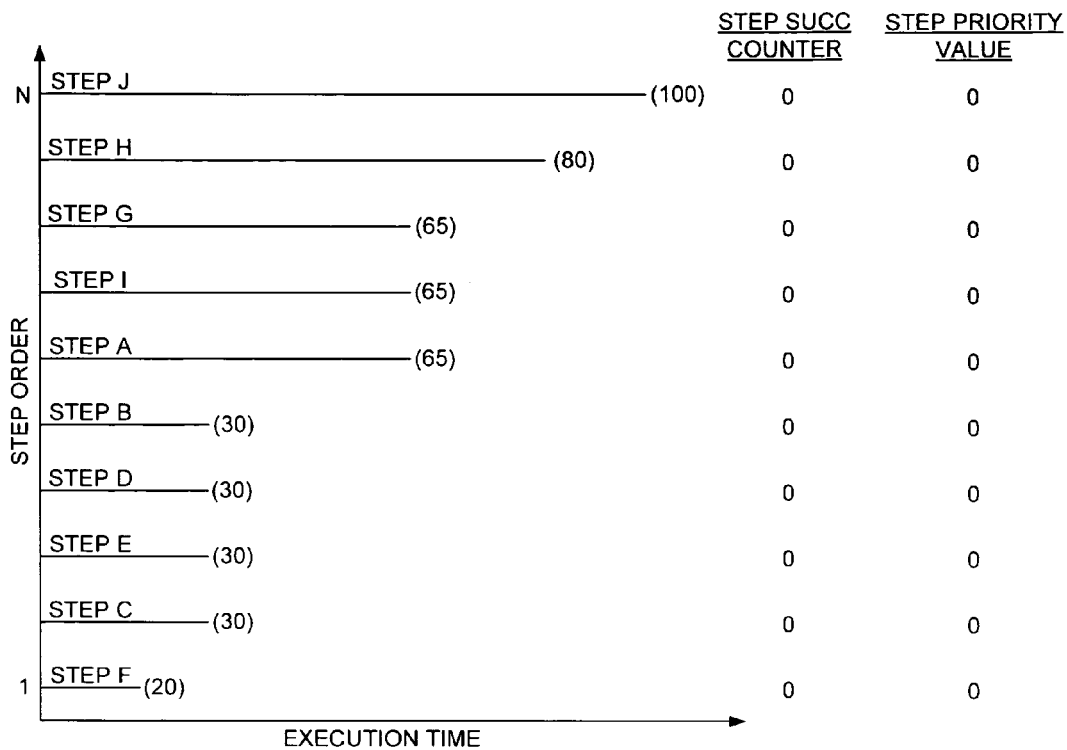
FIG. 4A shows a the error recovery steps ordered based on execution time.
Figure 4B:
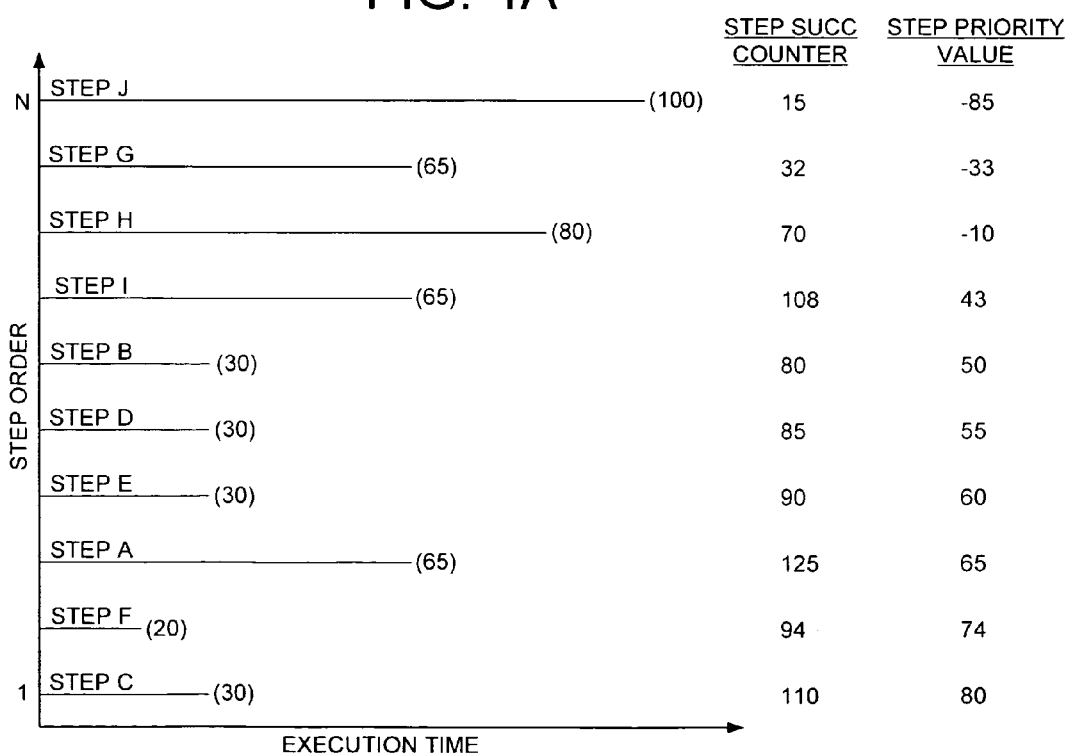
FIG. 4B shows the error recovery steps after ordering the error recovery steps according the flow diagram of FIG. 3.

FIG. 4A illustrates the error recovery steps ordered according to the execution times such that the error recovery steps having a shorter execution time are executed first. FIG. 4A also shows that at the beginning of the ordering process the step success counter for each error recovery step and the step priority value are initialized to zero. FIG. 4B illustrates how the error recovery steps are ordered after executing the flow diagram of FIG. 3. That is, the error recovery steps are ordered in response to the step priority values such that the error recovery steps having the higher step priority value are executed first. The step priority values are computed in this embodiment by subtracting the execution time (shown in parenthesis) from the step success counter. In the example of FIG. 4B, step C has the highest step priority value even though it does not have the shortest execution time. This order may shorten the average execution time for the error recovery procedure since step C is able to recover a large percentage of the errant data sectors without having to execute other steps (such as step F) which may not succeed as frequently.

Figure 5A:
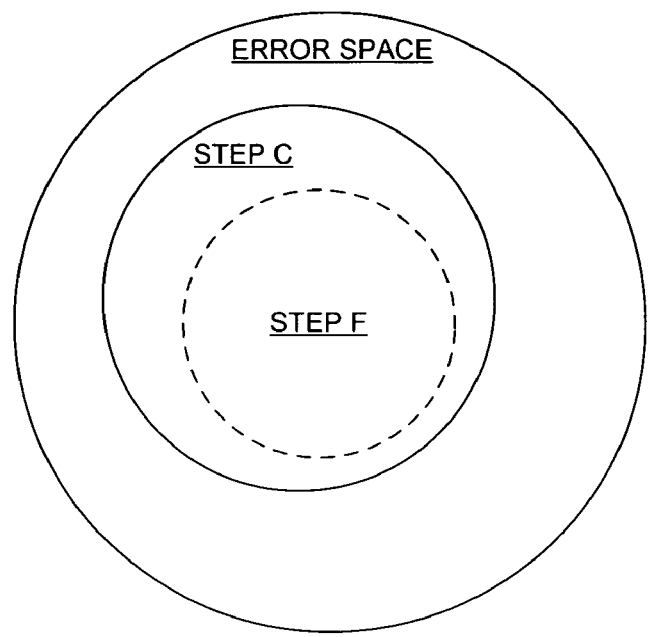
FIG. 5A is a Venn diagram illustrating why error recovery steps that are subsumed by other error recovery steps should be reordered toward the end of the error recovery procedure (or pruned altogether).

In other embodiments of the present invention, further improvements may be made to the order of the error recovery steps. For example, it may be possible to reorder one or more of the error recovery steps toward the end of the error recovery procedure if they are subsumed by another error recovery step. This embodiment is illustrated by the Venn diagram of FIG. 5A which shows the entire error space, as well as the error types recovered by step C and step F. Since step C will recovery all of the errors that can be recovered by step F, step F is unnecessary. That is, if step C is unable to recover an errant data sector, step F will also be unable to recover the data sector resulting in a waste of time if executed. Therefore, step F is reordered toward the end of the error recovery procedure (or pruned altogether) to further reduce the average execution time of the error recovery procedure.

Figure 6:
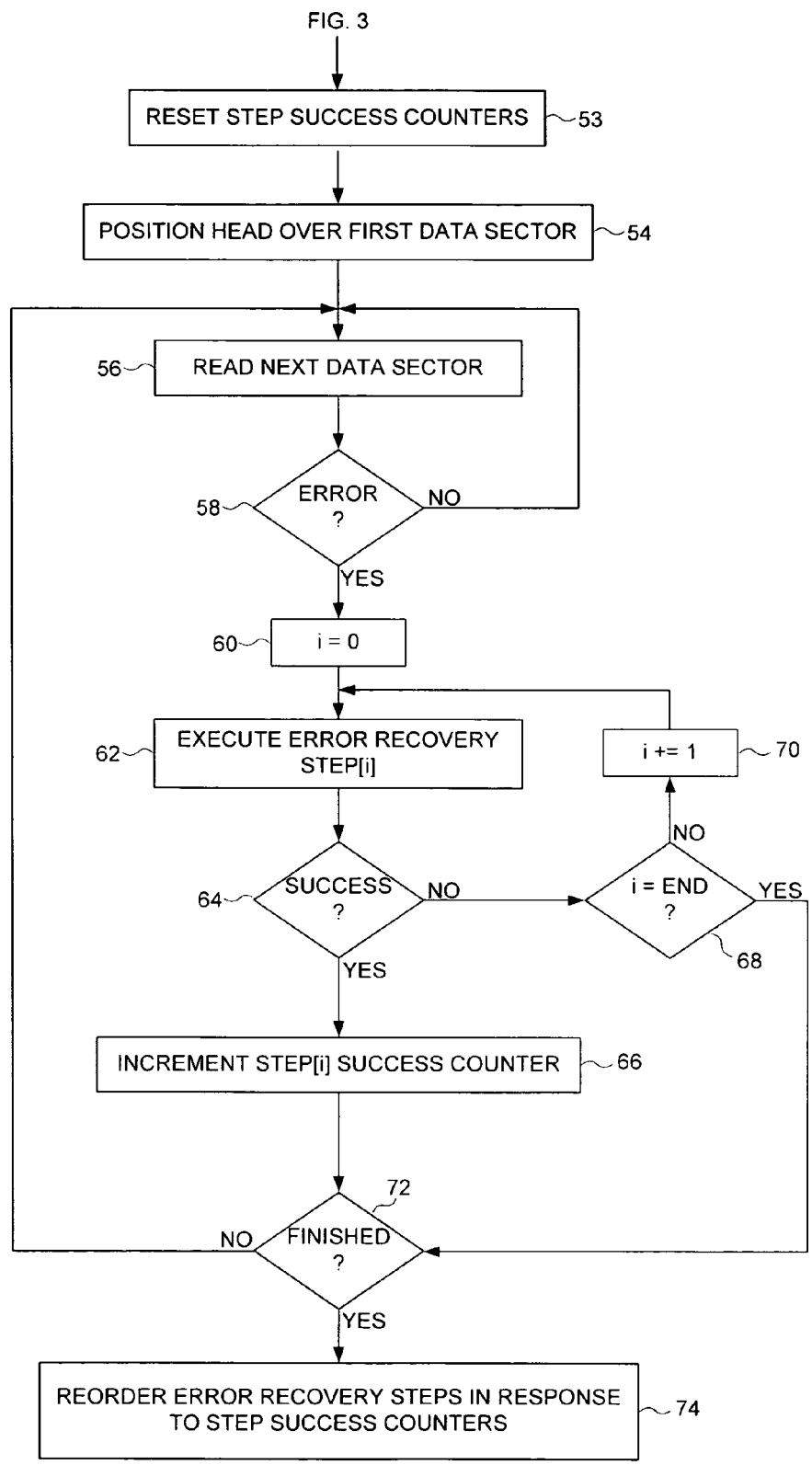
FIG. 6 is a flow diagram according to an embodiment of the present invention for reordering redundant error recovery steps toward the end of the error recovery procedure (or pruning the steps altogether).

FIG. 6 shows a flow diagram according to an embodiment of the present invention for identifying the redundant error recovery steps that should be reordered toward the end the error recovery procedure (or pruned altogether). The flow diagram of FIG. 6 is executed after ordering the error recovery steps using the flow diagram of FIG. 3. At step 53 the step success counters for the error recovery steps are reset. At step 54 the head 4 is positioned over the first data sector and at step 56 the data sector is read. If at step 58 the data sector cannot be recovered on-the-fly using the ECC circuitry, then at step 60 an index 1 is initialized to zero and at step 62 error recovery step[i] is executed in an attempt to recover the errant data sector. If at step 64 the error recovery step[i] is successful in recovering the errant data sector, at step 66 the corresponding step success counter is incremented and the error recovery procedure is terminated for the current data sector. If the error recover step[i] is not successful in recovering the current data sector, the next error recovery step is executed at step 62 (after incrementing index 1 at step 70). This process is repeated until one of the error recovery steps is successful at step 64, or at step 68 all of the error recovery steps have been attempted for the errant data sector. If there are more data sectors to read at step 72, then the process continues at step 56 by reading the next data sector. Once all of the data sectors have been read at step 72, at step 74 the error recovery steps are reordered in response to the step success counters. For example, the error recovery steps having a success counter value less than a predetermined threshold are reordered toward the end of the error recovery procedure (or pruned altogether).

In another embodiment of the present invention, a further improvement is made to the ordering of the error recovery steps by optimizing the order of consecutive error recovery steps having the same execution time. Referring to the example of FIG. 4B, consecutive error recovery steps step B, step D, and step E, each have the same execution time but may not be ordered optimally. This is illustrated by the Venn diagram shown in FIG. 5B wherein step D has a significant overlap with step E in the type of errors corrected, whereas the overlap of step B has a significantly less overlap with step E. This overlap means that if step E is unable to recovery an errant data sector there is a high probability that step D will also be unable to recover the data sector whereas there is a higher probability that step B will be able to recover the data sector. Therefore, these consecutive error recovery steps should be reordered so that step B is executed before step D.

Figure 7:
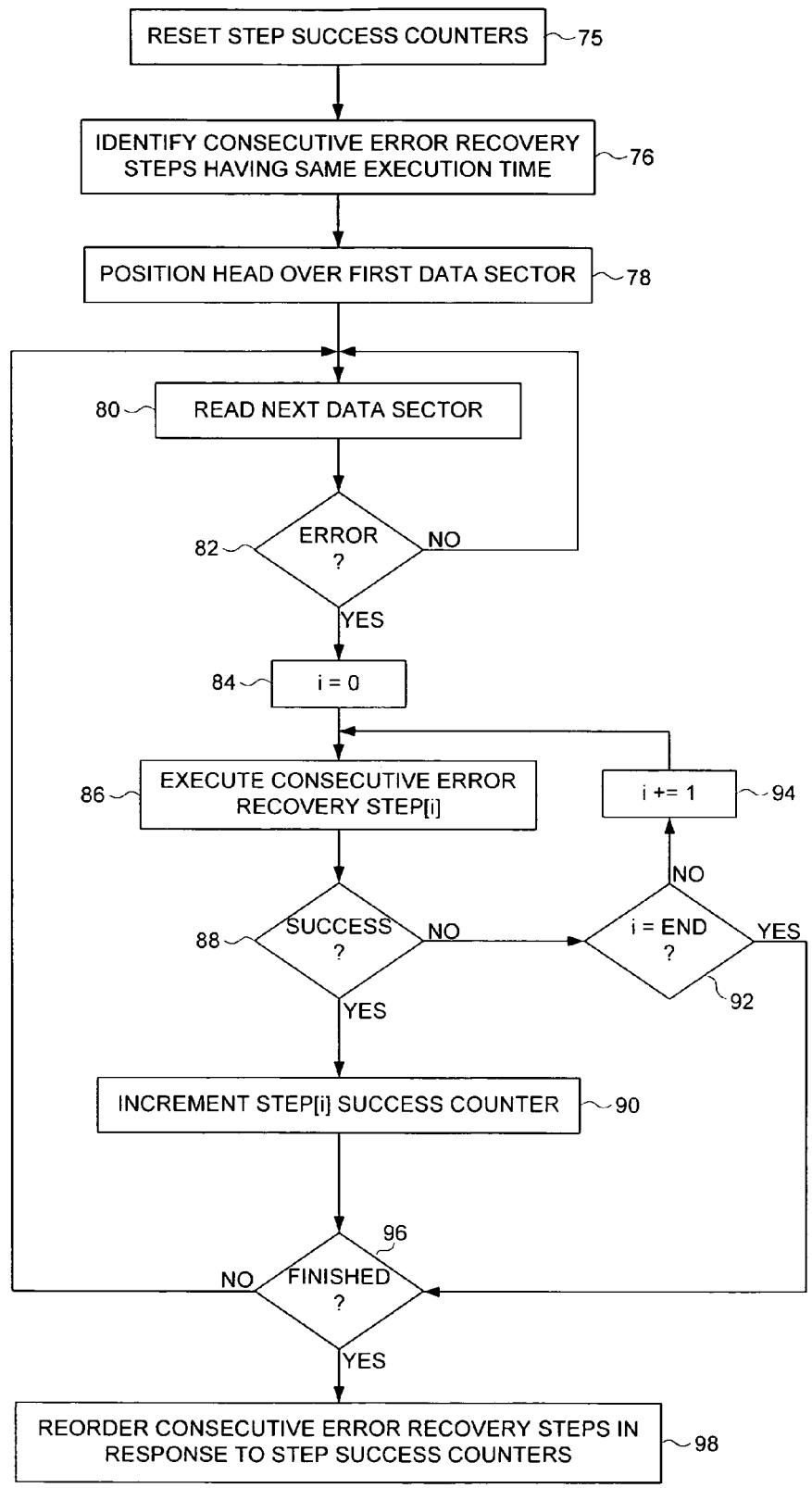
FIG. 7 is a flow diagram according to an embodiment of the present invention for reordering consecutive error recovery steps having the same execution time.

FIG. 7 shows a flow diagram according to an embodiment of the present invention for reordering consecutive error recovery steps that have the same execution time. At step 75 the step success counters for the error recovery steps are reset, and at step 76 the consecutive error recovery steps having the same execution time are identified. At step 78 the head 4 is positioned over the first data sector and at step 80 the data sector is read. If at step 82 the data sector cannot be recovered on-the-fly using the ECC circuitry, then at step 84 an index 1 is initialized to zero and at step 86 consecutive error recovery step[i] is executed in an attempt to recover the errant data sector. If at step 88 the consecutive error recovery step[i] is successful in recovering the errant data sector, at step 90 the corresponding step success counter is incremented and the error recovery procedure is terminated for the current data sector. If the consecutive error recover step[i] is not successful in recovering the current data sector at step 88, the next error recovery step is executed at step 86 (after incrementing index 1 at step 94). This process is repeated until one of the consecutive error recovery steps is successful at step 88, or at step 92 all of the consecutive error recovery steps have been attempted for the errant data sector. If there are more data sectors to read at step 96, then the process continues at step 80 by reading the next data sector. Once all of the data sectors have been read at step 96, at step 98 the consecutive error recovery steps are reordered in response to the step success counters.

Figure 5B:
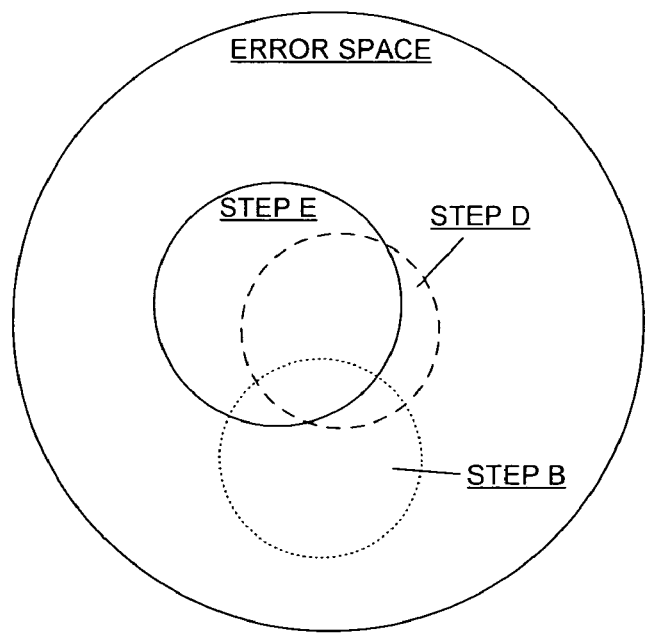
FIG. 5B is a Venn diagram illustrating why certain error recovery steps that have the same execution time should be reordered based on the overlap in efficacy of certain error recovery steps.

In the example of FIG. 4B and FIG. 5B, if the error recovery step E is successful at recovering an errant data sector at step 88 of FIG. 7, then the error recovery procedure terminates without executing step D (and without incrementing step D's success counter). If step E and step D are unable to recover a data sector (which is likely due to the overlap in the Venn diagram shown in FIG. 5B) and step B is able to recover the data sector, then the step success counter for step B is incremented. After executing the flow diagram of FIG. 7, the step success counter for step B may be greater than the step success counter for step D. Accordingly, the error recovery steps of FIG. 4B may be reordered such that step B is executed before step D in order to reduce the average execution time of the error recovery procedure.

Other embodiments of the present invention may be implemented by the disk control circuitry 8 to optimize the execution order of the error recovery steps. For example, the flow diagram of FIG. 6 could be executed for the entire set of error recovery steps after ordering the error recovery steps according to execution time (FIG. 4A) or after ordering the error recovery steps according to the flow diagram of FIG. 3. After executing the flow diagram of FIG. 6, the error recovery steps may be ordered based on the step success counters alone or based on a step priority value computed as a function of the step success counters and execution times.

The flow diagram of FIG. 3 may be executed during a manufacturing process, as described above, or during a calibration mode while the disk drive is in the field, for example, during an idle time of the disk drive. The flow diagrams of FIG. 6 and FIG. 7 may be executed during a manufacturing process, during a calibration mode, or during normal operation of the disk drive whenever a data sector cannot be recovered using the ECC circuitry. That is, step success counters can be maintained over the life of the disk drive in order to prune or reorder the error recovery steps to reduce the average execution time of the error recovery procedure.

I claim:

1. A disk drive comprising:
   a disk comprising a plurality of tracks, wherein each track comprises a plurality of data sectors;
   a head actuated over the disk; and
   disk control circuitry for executing an error recovery procedure comprising a plurality of error recovery steps, wherein each error recovery step having an execution time, the disk control circuitry for ordering the error recovery steps by:
   initializing a plurality of step success counters each corresponding to one of the error recovery steps;
   executing a plurality of the error recovery steps for a plurality of the data sectors, wherein if one of the error recovery steps successfully recovers one of the data sectors, incrementing the corresponding step success counter;
   computing a step priority value for each error recovery step in response to the step success counter and the execution time for each error recovery step; and
   ordering the error recovery steps in response to the step priority values.

2. The disk drive as recited in claim 1, wherein more than one of the error recovery steps may successfully recover a data sector.

3. The disk drive as recited in claim 2, wherein the disk control circuitry further executes the steps of:
   resetting the step success counters;
   re-executing a plurality of the error recovery steps for a plurality of the data sectors, wherein the disk control circuitry terminates the error recovery procedure for a current data sector when one of the error recovery steps successfully recovers the data sector and increments the corresponding step success counter; and
   reordering the error recovery steps in response to the step success counters.

4. The disk drive as recited in claim 3, wherein:
   the plurality of error recovery steps that are re-executed are consecutive after ordering the error recovery steps in response to the step priority values; and
   the plurality of error recovery steps re-executed have the same execution time.

5. The disk drive as recited in claim 3, wherein the disk control circuitry reorders the error recovery steps in response to the step success counters by pruning at least one of the error recovery steps from the error recovery procedure.

6. The disk drive as recited in claim 1, wherein the disk control circuitry terminates the error recovery procedure for a data sector when one of the error recovery steps successfully recovers the data sector.

7. The disk drive as recited in claim 1, wherein the disk control circuitry orders the error recovery steps in response to the step priority values by pruning at least one of the error recovery steps from the error recovery procedure.

8. A method of ordering a plurality of error recovery steps of an error recovery procedure executed by a disk drive, wherein each error recovery step having an execution time, the disk drive comprising a disk and a head actuated over the disk, wherein the disk comprises a plurality of tracks and each track comprises a plurality of data sectors, the method comprising the steps of:
   initializing a plurality of step success counters each corresponding to one of the error recovery steps;
   executing a plurality of the error recovery steps for a plurality of the data sectors, wherein if one of the error recovery steps successfully recovers one of the data sectors, incrementing the corresponding step success counter;
   computing a step priority value for each error recovery step in response to the step success counter and the execution time for each error recovery step; and
   ordering the error recovery steps in response to the step priority values.

9. The method as recited in claim 8, wherein more than one of the error recovery steps may successfully recover a data sector.

10. The method as recited in claim 9, further comprising the steps of:
    resetting the step success counters;
    re-executing a plurality of the error recovery steps for a plurality of the data sectors, wherein the error recovery procedure is terminated for a current data sector when one of the error recovery steps successfully recovers the data sector and the corresponding step success counter is incremented; and
    reordering the error recovery steps in response to the step success counters.

11. The method as recited in claim 10, wherein:
    the plurality of error recovery steps that are re-executed are consecutive after ordering the error recovery steps in response to the step priority values; and
    the plurality of error recovery steps re-executed have the same execution time.

12. The method as recited in claim 10, wherein the step of reordering the error recovery steps in response to the step success counters comprises the step of pruning at least one of the error recovery steps from the error recovery procedure.

13. The method as recited in claim 8, wherein the error recovery procedure is terminated for a data sector when one of the error recovery steps successfully recovers the data sector.

14. The method as recited in claim 8, wherein the step of ordering the error recovery steps in response to the step priority values comprises the step of pruning at least one of the error recovery steps from the error recovery procedure.

* * * * *